United States Patent
Du et al.

(10) Patent No.: US 11,637,665 B2
(45) Date of Patent: Apr. 25, 2023

(54) FORWARDING TABLE GENERATION METHOD AND FORWARDING DEVICE

(71) Applicant: HUAWEI TECHNOLOGIES CO., LTD., Shenzhen (CN)

(72) Inventors: Zongpeng Du, Shenzhen (CN); Guoyi Chen, Beijing (CN); Jie Dong, Beijing (CN); Xinyuan Wang, Beijing (CN); Jun Gong, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 77 days.

(21) Appl. No.: 17/168,198

(22) Filed: Feb. 5, 2021

(65) Prior Publication Data

US 2021/0218521 A1  Jul. 15, 2021

Related U.S. Application Data

(63) Continuation of application No. 16/240,782, filed on Jan. 6, 2019, now Pat. No. 10,938,527, which is a
(Continued)

(51) Int. Cl.
*H04L 5/00* (2006.01)
*H04L 45/50* (2022.01)
(Continued)

(52) U.S. Cl.
CPC .......... *H04L 5/0044* (2013.01); *H04L 12/413* (2013.01); *H04L 45/50* (2013.01); *H04L 45/245* (2013.01); *H04L 47/724* (2013.01)

(58) Field of Classification Search
CPC ..... H04L 5/0044; H04L 12/413; H04L 45/50; H04L 47/724; H04L 45/245
See application file for complete search history.

(56) References Cited

U.S. PATENT DOCUMENTS

| 7,570,657 | B1 | 8/2009 | Lo |
| 2004/0109465 | A1 | 6/2004 | Kim et al. |

(Continued)

FOREIGN PATENT DOCUMENTS

| CN | 101212396 A | 7/2008 |
| CN | 101212424 A | 7/2008 |

(Continued)

OTHER PUBLICATIONS

Stephen J Trowbridge Alcatel-Lucent USA: "Mapping of Flex Ethernet Clients over OTN;C 1213", ITU-T Draft; Study Period 2013-2016, International Telecommunication Union, Geneva; CH, vol. 11/15, Jun. 6, 2015 (Jun. 6, 2015), pp. 1-7, XP044136865, total 7 pages.

(Continued)

*Primary Examiner* — Chi Ho A Lee
(74) *Attorney, Agent, or Firm* — Maier & Maier, PLLC

(57) ABSTRACT

A forwarding table generation method is provided. The method includes: determining, by a forwarding device, a first timeslot set, where the first timeslot set includes multiple timeslots during which the forwarding device sends, to a first device by using a first flexible Ethernet group, multiple encoded data blocks generated by a physical coding sublayer; determining, by the forwarding device, a second timeslot set, where the second timeslot set includes multiple timeslots during which the forwarding device receives, by using a second FlexE group, the multiple encoded data blocks sent by a second device; and generating, by the forwarding device, a forwarding table, where the forwarding table includes a mapping relationship between the second FlexE group and the multiple timeslots included in the second timeslot set, and between the first FlexE group and the multiple timeslots included in the first timeslot set.

20 Claims, 6 Drawing Sheets

Related U.S. Application Data continuation of application No. PCT/CN2016/088933, filed on Jul. 6, 2016.

(51) Int. Cl.
*H04L 12/413* (2006.01)
*H04L 45/24* (2022.01)
*H04L 47/724* (2022.01)

(56) References Cited

U.S. PATENT DOCUMENTS

| | | | |
|---|---|---|---|
| 2004/0120327 A1 | 6/2004 | Son et al. | |
| 2009/0245289 A1 | 10/2009 | Sprague | |
| 2012/0033678 A1 | 2/2012 | Page et al. | |
| 2013/0106582 A1 | 5/2013 | Kangas et al. | |
| 2016/0028586 A1* | 1/2016 | Blair | H04L 41/0826 398/45 |
| 2016/0119075 A1 | 4/2016 | Gareau | |
| 2016/0119076 A1 | 4/2016 | Gareau | |
| 2016/0191277 A1 | 6/2016 | Li et al. | |
| 2016/0197743 A1 | 7/2016 | Su et al. | |
| 2016/0315634 A1 | 10/2016 | Mei et al. | |
| 2016/0315793 A1 | 10/2016 | Chen et al. | |
| 2017/0005742 A1* | 1/2017 | Gareau | H04J 3/1611 |
| 2017/0005901 A1* | 1/2017 | Gareau | H04L 43/10 |
| 2017/0085474 A1 | 3/2017 | Hughes et al. | |
| 2017/0142008 A1 | 5/2017 | Yoo et al. | |
| 2017/0223436 A1* | 8/2017 | Moynihan | H04L 45/28 |
| 2018/0013511 A1* | 1/2018 | Hussain | G02B 6/12033 |
| 2019/0140943 A1 | 5/2019 | Du et al. | |
| 2019/0173856 A1 | 6/2019 | Gareau et al. | |
| 2020/0007255 A1* | 1/2020 | Gareau | H04J 3/1611 |

FOREIGN PATENT DOCUMENTS

| | | |
|---|---|---|
| CN | 101582910 A | 11/2009 |
| CN | 102891813 A | 1/2013 |
| CN | 103875205 A | 6/2014 |
| CN | 104426631 A | 3/2015 |
| CN | 105009540 A | 10/2015 |
| CN | 105264778 A | 1/2016 |
| EP | 0939576 A2 | 9/1999 |
| EP | 3013017 A1 | 4/2016 |

OTHER PUBLICATIONS

Editor: "FlexE Implementation Agreement-Draft 1.3", ITU-T Draft; Study Period 2013-2016, International Telecommunication Union, Feb. 5, 2016, pp. 1-32, XP044165967.

Wang Q, et al., ZTE "RSVP-TE Signaling Extensions in support of Flexible Ethernet networks; draft-wang-ccamp-flexe-signaling-01.txt", Mar. 21, 2016, pp. 1-12, XP015112041.

Wang Q et al., ZTE, "Framework and Requirements for GMPLS-based Control of Flexible Ethernet Network; draft-wang-ccamp-flexe-fwk-00.txt", Mar. 8, 2016, pp. 1-14, XP015111592.

Hussain, et al., Infinera Corp., "FlexE Usecases; draft-hussain-ccamp-flexe-usecases-00.txt", Jun. 20, 2016, pp. 1-18, XP015113586.

D. Awduche et al, RSVP-TE: Extensions to RSVP for LSP Tunnels Networking Group, rfc3209, Dec. 2001, 61 pages.

R. Branden et al, Resource ReSerVation Protocol (RSVP)—Version 1 Functional Specification RFC2205, Sep. 1997, 112 pages.

K. Kompella et al. Procedures for Modifying the Resource reSerVation Protocol (RSVP), rfc 3936, Oct. 2004, 7 pages.

ITU-T G. 709/Y. 1331(Jun. 2016), Series G: Transmission Systems and Media, Digital Systems and Networks, Seres G: Transmission Systems and Media, Digital Systems and Networks, Digital terminal equipments—General Series Y: Global Information Infrastructure, Internet Protocol Aspects and Next-Generation Networks, Internet of Thins and Smart Cities, Internet protocol aspects—Transport Interfaces for the optical transport network, Jun. 2016. total 244 pages.

Flex Ethernet, Implementation Agreement, IA # OIF-FLEXE-01.0, Mar. 2016, 31 pages.

* cited by examiner

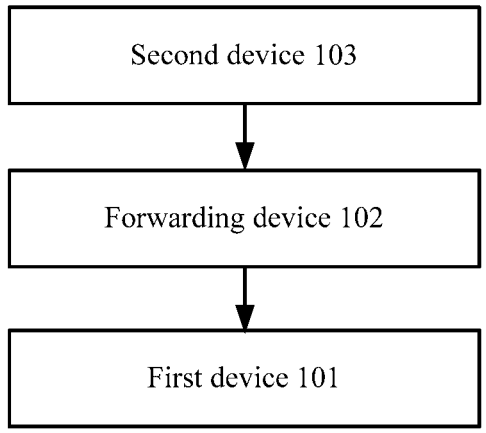

A forwarding device determines a first timeslot set, where the first timeslot set includes multiple timeslots used when the forwarding device sends, to a first device by using a first flexible Ethernet group, multiple encoded data blocks generated by a physical coding sublayer, and the multiple timeslots included in the first timeslot set are in a one-to-one correspondence with the multiple encoded data blocks — 210

The forwarding device determines a second timeslot set, where the second timeslot set includes multiple timeslots used when the forwarding device receives, by using a second FlexE group, the multiple encoded data blocks sent by a second device, where the multiple timeslots included in the second timeslot set are in a one-to-one correspondence with the multiple encoded data blocks — 220

The forwarding device generates a forwarding table, where the forwarding table includes a mapping relationship between the second FlexE group and the multiple timeslots in the second timeslot set, and between the first FlexE group and the multiple timeslots in the first timeslot set — 230

FIG. 2

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         Length              |  Class-number  |   Class-type   |
+-+-+-+-+-+-+-+-+-+-+-+-+-+-+-+-+-+-+-+-+-+-+-+-+-+-+-+-+-+-+-+-+
| LSP encoding type |  Switch type  |  Generalized protocol identifier |
+-+-+-+-+-+-+-+-+-+-+-+-+-+-+-+-+-+-+-+-+-+-+-+-+-+-+-+-+-+-+-+-+
```

FORWARDING TABLE GENERATION METHOD AND FORWARDING DEVICE

CROSS-REFERENCE TO RELATED APPLICATIONS

This application is a continuation of U.S. patent application Ser. No. 16/240,782, filed on Jan. 6, 2019, which is a continuation of International Application No. PCT/CN2016/088933, filed on Jul. 6, 2016, both of which are hereby incorporated by reference in their entireties.

TECHNICAL FIELD

The embodiments relate to the communications field, and more specifically, to a forwarding table generation method and a forwarding device.

BACKGROUND

Introduction of a concept of a flexible Ethernet (FlexE) provides a feasible evolution direction for Ethernet physical link virtualization. In the FlexE, one or more bound PHYs constitute a flexible Ethernet group (FlexE Group). The FlexE group may be considered as a FlexE link between a sending device and a receiving device. The FlexE link is a logical link. Bandwidth of the logical link is equal to a sum of bandwidth of the multiple bound PHYs. In a FlexE technical solution, bandwidth resources of the FlexE group are used by allocating time domain resources (for example, the time domain resources are divided into 20 or 80 timeslots), and a virtual link is implemented by performing timeslot configuration, so that the FlexE provides a service to a flexible Ethernet client (FlexE client).

When a sending device and a receiving device transmit a FlexE client via multiple nodes by using a FLexE technology, each node needs to perform forwarding in a conventional layer 2 (link layer) or layer 3 (network layer) forwarding mode according to a layer 2 or layer 3 forwarding table. Therefore, a delay is relatively large.

SUMMARY

Embodiments provide a forwarding table generation method in which a FlexE client is transmitted by using a forwarding table generated by a forwarding device, so as to reduce a delay.

According to a first aspect, a forwarding table generation method is provided, including: determining, by a forwarding device, a first timeslot set, where the first timeslot set includes multiple timeslots during which the forwarding device sends, to a first device by using a first flexible Ethernet group, multiple encoded data blocks generated by a physical coding sublayer (PCS), and the multiple timeslots included in the first timeslot set are in a one-to-one correspondence to the multiple encoded data blocks; determining, by the forwarding device, a second timeslot set, where the second timeslot set includes multiple timeslots during which the forwarding device receives, by using a second FlexE group, the multiple encoded data blocks sent by a second device, and the multiple timeslots included in the second timeslot set are in a one-to-one correspondence to the multiple encoded data blocks; and generating, by the forwarding device, a forwarding table, where the forwarding table includes a mapping relationship between the second FlexE group and the multiple timeslots included in the second timeslot set, and between the first FlexE group and the multiple timeslots included in the first timeslot set.

According to the forwarding table generation method in this embodiment, a forwarding device establishes a forwarding table, so that when a FlexE client is being transmitted, the forwarding device can map encoded data blocks transmitted in multiple timeslots in a first timeslot set into multiple timeslots in a second timeslot set for forwarding, so as to reduce a transmission delay, and improve transmission efficiency.

In a possible implementation, the determining, by a forwarding device, of a first timeslot set includes: receiving, by the forwarding device, a first message sent by the first device, where the first message is used to instruct the forwarding device to determine the first timeslot set; and determining, by the forwarding device, first available timeslots of the forwarding device as the first timeslot set.

In a possible implementation, the method may further include: sending, by the forwarding device, a second message to the first device, where the second message carries identifiers of the multiple timeslots included in the first timeslot set, and the second message is used to instruct the first device to determine the multiple timeslots included in the first timeslot set as timeslots during which the first device receives the multiple encoded data blocks by using the first FlexE group.

In a possible implementation, the determining, by the forwarding device, of a second timeslot set includes: sending, by the forwarding device, a third message to the second device, where the third message is used to instruct the second device to determine second available timeslots of the second device as the second timeslot set; receiving, by the forwarding device, a fourth message sent by the second device, where the fourth message carries identifiers of the multiple timeslots included in the second timeslot set; and determining, by the forwarding device, the second timeslot set according to the identifiers that are of the multiple timeslots included in the second timeslot set and that are carried in the fourth message.

In a possible implementation, the determining, by a forwarding device, of a first timeslot set includes: receiving, by the forwarding device, identifiers that are of the multiple timeslots included in the first timeslot set and that are sent by the first device, where the multiple timeslots included in the first timeslot set are timeslots that are determined by the first device and that are used to receive the multiple encoded data blocks by using the first FlexE group; and determining, by the forwarding device, the first timeslot set according to the identifiers that are of the multiple timeslots included in the first timeslot set and that are sent by the first device.

In a possible implementation, the method may further include: sending, by the forwarding device, an instruction message to the second device, where the instruction message carries identifiers of the multiple timeslots included in the second timeslot set, and the instruction message is used to instruct the second device to configure the multiple timeslots included in the second timeslot set as timeslots during which the second device sends the multiple encoded data blocks to the forwarding device by using the second FlexE group.

In a possible implementation, the receiving, by the forwarding device, of identifiers that are of the multiple timeslots in the first timeslot set and that are sent by the first device includes: receiving, by the forwarding device, a generalized multiprotocol label switching (GMPLS) label sent by the first device, where the GMPLS label includes a first field and a second field, the first field represents the identifiers of the multiple timeslots included in the first timeslot set, and the second field represents the first FlexE group.

In a possible implementation, before the determining, by a forwarding device, of a first timeslot set, the method further includes: receiving, by the forwarding device, a path message sent by the second device, where the path message includes path type instruction information, and the path type instruction information is used to instruct to establish a FlexE-based path; and forwarding, by the forwarding device, the path message to the first device.

In a possible implementation, the path message may further include traffic parameter attribute information, where the traffic parameter attribute information includes a signal type field and a bit_rate field, the signal type field represents that a type of a transmitted signal is an encoded data block whose rate is 5 Gbps (gigabits per second), and the bit_rate field represents a rate of a FlexE client corresponding to the multiple encoded data blocks.

According to a second aspect, a forwarding table generation method is provided, including: sending, by a first device, a first message to a forwarding device, where the first message is used to instruct the forwarding device to determine a first timeslot set, the first timeslot set includes multiple timeslots during which the forwarding device sends, to the first device by using a first FlexE group, multiple encoded data blocks generated by a physical coding sublayer, and the multiple timeslots included in the first timeslot set are in a one-to-one correspondence to the multiple encoded data blocks; receiving, by the first device, a second message sent by the forwarding device based on the first message, where the second message carries identifiers of the multiple timeslots included in the first timeslot set; and determining, by the first device, the first timeslot set according to the second message, and determining the multiple timeslots included in the first timeslot set as timeslots during which the first device receives the multiple encoded data blocks by using the first FlexE group.

In a possible implementation, before the sending, by a first device, of a first message to a forwarding device, the method may further include: receiving, by the first device, a path message sent by the forwarding device, where the path message includes path type instruction information, and the path type instruction information is used to instruct to establish a FlexE-based path.

In a possible implementation, the path message may further include traffic parameter attribute information, where the traffic parameter attribute information includes a signal type field and a bit_rate field, the signal type field represents that a type of a transmitted signal is an encoded data block whose rate is 5 Gbps, and the bit_rate field represents a rate of a FlexE client corresponding to the multiple encoded data blocks.

According to a third aspect, a forwarding table generation method is provided, including: determining, by a first device, a first timeslot set, where the first timeslot set includes multiple timeslots during which the first device receives, by using a first flexible Ethernet group FlexE group, multiple encoded data blocks generated by a physical coding sublayer that are sent by the first device, and the multiple timeslots included in the first timeslot set are in a one-to-one correspondence to the multiple encoded data blocks; and sending, by the first device, identifiers of the multiple timeslots included in the first timeslot set to a forwarding device, so that the forwarding device determines the multiple timeslots included in the first timeslot set as timeslots during which the forwarding device sends the multiple encoded data blocks to the first device by using the first FlexE group.

In a possible implementation, the sending, by the first device, of identifiers of the multiple timeslots included in the first timeslot set to a forwarding device includes: sending, by the first device, a GMPLS label to the forwarding device, where the GMPLS label includes a first field and a second field, the first field represents the identifiers of the multiple timeslots included in the first timeslot set, and the second field represents the first FlexE group.

In a possible implementation, before the sending, by the first device, of identifiers of the multiple timeslots included in the first timeslot set to a forwarding device, the method may further include: receiving, by the first device, a path message sent by the forwarding device, where the path message includes path type instruction information, and the path type instruction information is used to instruct to establish a FlexE-based path; and the sending, by the first device, identifiers of the multiple timeslots included in the first timeslot set to a forwarding device includes: sending, by the first device to the forwarding device, a reservation message in response to the path message, where the reservation message includes the identifiers of the multiple timeslots in the first timeslot set.

In a possible implementation, the path message may further include traffic parameter attribute information, where the traffic parameter attribute information includes a signal type field and a bit_rate field, the signal type field represents that a type of a transmitted signal is an encoded data block whose rate is 5 Gbps, and the bit_rate field represents a rate of a FlexE client corresponding to the multiple encoded data blocks.

In a possible implementation, the path message may further include label request information, where the label request information includes a length field, a class-number field, a class-type field, a label switched path (LSP) encoding type field, a switch type field, and a generalized protocol identifier (G-PID) field, where a value of the length field represents a length of the label request information, a value of the class-number field represents the label request information, a value of the class-type field represents that a label request is a generalized label request, a value of the LSP encoding type field represents the FlexE-based path, a value of the switch type field represents that an applied switching technology is a FlexE, and a value of the generalized protocol identifier field represents that a 64B/66B Ethernet technology is used and is applied to a flexible Ethernet.

According to a fourth aspect, a forwarding table generation method is provided, including: receiving, by a second device, a third message sent by a forwarding device, where the third message is used to instruct the second device to determine a second timeslot set, the second timeslot set includes multiple timeslots during which the forwarding device receives, by using a second FlexE group, multiple encoded data blocks sent by the second device, and the multiple timeslots included in the second timeslot set are in a one-to-one correspondence to the multiple encoded data blocks; determining, by the second device, the second timeslot set according to the third message; and sending, by the second device, a fourth message to the forwarding device, where the fourth message carries identifiers of the multiple timeslots included in the second timeslot set, and the fourth message is used to instruct the forwarding device to configure the multiple timeslots included in the second timeslot set as timeslots during which the second device sends the multiple encoded data blocks to the forwarding device by using the second FlexE group.

In a possible implementation, before the receiving, by a second device, of a third message sent by a forwarding device, the method may further include: sending, by the second device, a path message to the forwarding device, where the path message includes path type instruction information, and the path type instruction information is used to instruct to establish a FlexE-based path.

In a possible implementation, the path message may further include traffic parameter attribute information, where the traffic parameter attribute information includes a signal type field and a bit_rate field, the signal type field represents that a type of a transmitted signal is an encoded data block whose rate is 5 Gbps, and the bit_rate field represents a rate of a FlexE client corresponding to the multiple encoded data blocks.

According to a fifth aspect, a forwarding table generation method is provided, including: receiving, by a second device, an instruction message sent by a forwarding device, where the instruction message carries identifiers of multiple timeslots included in a second timeslot set, the second timeslot set includes the multiple timeslots during which the forwarding device receives, by using a second FlexE group, multiple encoded data blocks sent by the second device, and the multiple timeslots included in the second timeslot set are in a one-to-one correspondence to the multiple encoded data blocks; and configuring, by the second device according to the instruction message, the multiple timeslots included in the second timeslot set as timeslots during which the second device sends the multiple encoded data blocks to the forwarding device by using the second FlexE group.

In a possible implementation, the receiving, by a second device, of an instruction message sent by a forwarding device includes: receiving, by the second device, a GMPLS label sent by the forwarding device, where the GMPLS label includes a first field and a second field, the first field represents the identifiers of the multiple timeslots included in the second timeslot set, and the second field represents the second FlexE group.

In a possible implementation, before the receiving, by a second device, of an instruction message sent by a forwarding device, the method may further include: receiving, by the second device, a path message sent by the forwarding device, where the path message includes path type instruction information, and the path type instruction information is used to instruct to establish a FlexE-based path.

In a possible implementation, the path message further includes traffic parameter attribute information, where the traffic parameter attribute information includes a signal type field and a bit_rate field, the signal type field represents that a type of a transmitted signal is an encoded data block whose rate is 5 Gbps, and the bit_rate field represents a rate of a FlexE client corresponding to the multiple encoded data blocks.

In a possible implementation, the path message further includes label request information, where the label request information includes a length field, a class-number field, a class-type field, an LSP encoding type field, a switch type field, and a generalized protocol identifier field, a value of the length field represents a length of the label request information, a value of the class-number field represents the label request information, a value of the class-type field represents that a label request is a generalized label request, a value of the LSP encoding type field represents the FlexE-based path, the switch type field represents that an applied switching technology is a FlexE, and a value of the generalized protocol identifier field represents that a 64B/66B Ethernet technology is used and is applied to a flexible Ethernet.

According to a sixth aspect, a forwarding device is provided, and is configured to execute the method in the first aspect or any possible implementation of the first aspect. For example, the forwarding device includes units configured to execute the method in the first aspect or any possible implementation of the first aspect.

According to a seventh aspect, a first device is provided, and is configured to execute the method in the second aspect or any possible implementation of the second aspect. For example, the first device includes units configured to execute the method in the second aspect or any possible implementation of the second aspect.

According to an eighth aspect, a first device is provided, and is configured to execute the method in the third aspect or any possible implementation of the third aspect. For example, the first device includes units configured to execute the method in the third aspect or any possible implementation of the third aspect.

According to a ninth aspect, a second device is provided, and is configured to execute the method in the fourth aspect or any possible implementation of the fourth aspect. For example, the first device includes units configured to execute the method in the fourth aspect or any possible implementation of the fourth aspect.

According to a tenth aspect, a second device is provided, and is configured to execute the method in the fifth aspect or any possible implementation of the fifth aspect. For example, the first device includes units configured to execute the method in the fifth aspect or any possible implementation of the fifth aspect.

According to an eleventh aspect, a forwarding device is provided. The forwarding device includes a receiver, a transmitter, a processor, a memory, and a bus system. The receiver, the transmitter, the processor, and the memory are connected by using the bus system. The memory is configured to store an instruction. The processor is configured to execute the instruction stored in the memory, so as to control the receiver to receive a signal and control the transmitter to send a signal. In addition, when the processor executes the instruction stored in the memory, the processor executes the method in the first aspect or any possible implementation of the first aspect.

According to a twelfth aspect, a first device is provided. The first device includes a receiver, a transmitter, a processor, a memory, and a bus system. The receiver, the transmitter, the processor, and the memory are connected by using the bus system. The memory is configured to store an instruction. The processor is configured to execute the instruction stored in the memory, so as to control the receiver to receive a signal and control the transmitter to send a signal. In addition, when the processor executes the instruction stored in the memory, the processor executes the method in the second aspect or any possible implementation of the second aspect.

According to a thirteenth aspect, a first device is provided. The first device includes a receiver, a transmitter, a processor, a memory, and a bus system. The receiver, the transmitter, the processor, and the memory are connected by using the bus system. The memory is configured to store an instruction. The processor is configured to execute the instruction stored in the memory, so as to control the receiver to receive a signal and control the transmitter to send a signal. In addition, when the processor executes the instruction stored in the memory, the processor executes the method in the third aspect or any possible implementation of the third aspect.

According to a fourteenth aspect, a second device is provided. The second device includes a receiver, a transmitter, a processor, a memory, and a bus system. The receiver, the transmitter, the processor, and the memory are connected by using the bus system. The memory is configured to store an instruction. The processor is configured to execute the instruction stored in the memory, so as to control the receiver to receive a signal and control the transmitter to send a signal. In addition, when the processor executes the instruction stored in the memory, the processor executes the method in the fourth aspect or any possible implementation of the fourth aspect.

According to a fifteenth aspect, a second device is provided. The second device includes a receiver, a transmitter, a processor, a memory, and a bus system. The receiver, the transmitter, the processor, and the memory are connected by using the bus system. The memory is configured to store an instruction. The processor is configured to execute the instruction stored in the memory, so as to control the receiver to receive a signal and control the transmitter to send a signal. In addition, when the processor executes the instruction stored in the memory, the processor executes the method in the fifth aspect or any possible implementation of the fifth aspect.

According to a sixteenth aspect, the embodiments provide a computer readable medium, configured to store a computer program. The computer program includes an instruction used to execute the method in the first aspect or any possible implementation of the first aspect.

According to a seventeenth aspect, the embodiments provide a computer readable medium, configured to store a computer program. The computer program includes an instruction used to execute the method in the second aspect or any possible implementation of the second aspect.

According to an eighteenth aspect, the embodiments provide a computer readable medium, configured to store a computer program. The computer program includes an instruction used to execute the method in the third aspect or any possible implementation of the third aspect.

According to a nineteenth aspect, the embodiments provide a computer readable medium, configured to store a computer program. The computer program includes an instruction used to execute the method in the fourth aspect or any possible implementation of the fourth aspect.

According to a twentieth aspect, the embodiments provide a computer readable medium, configured to store a computer program. The computer program includes an instruction used to execute the method in the fifth aspect or any possible implementation of the fifth aspect.

BRIEF DESCRIPTION OF DRAWINGS

To describe the solutions in the embodiments more clearly, the following briefly describes the accompanying drawings required for describing the embodiments. The accompanying drawings in the following description merely show some embodiments, and persons of ordinary skill in the art can derive other drawings from these accompanying drawings without departing from the scope of the embodiments.

FIG. 1 is a schematic block diagram of an application scenario of a forwarding table generation method according to an embodiment;

FIG. 2 is a schematic flowchart of a forwarding table generation method according to an embodiment;

DETAILED DESCRIPTION OF THE EMBODIMENTS

Figure 3:
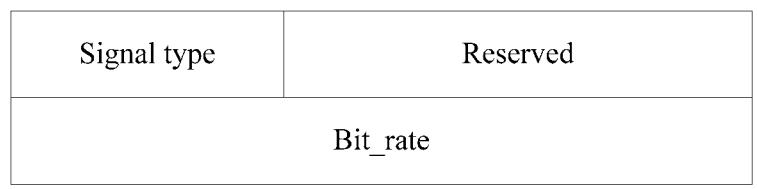
FIG. 3 is a schematic diagram of a format of traffic parameter attribute information according to an embodiment.

The following clearly describes the solutions in the embodiments with reference to the accompanying drawings in the embodiments. The described embodiments are some but not all of the embodiments. Based on the embodiments, persons of ordinary skill in the art may derive other embodiments without departing from the scope of the embodiments.

The following briefly describes the terms used in the embodiments.

A flexible Ethernet client (FlexE client) is an Ethernet flow. For the Ethernet flow, an Ethernet MAC rate is corresponding to or not corresponding to an Ethernet PHY rate.

A flexible Ethernet group (FlexE Group) is a group of from 1 to n bonded Ethernet PHYs, where a value of n is equal to 254. For example, the FlexE group may be one bonded Ethernet PHY. The FlexE group may be two bonded Ethernet PHYs. The FlexE group may be five bonded Ethernet PHYs.

For one bonded Ethernet PHY, one send PHY is bonded to a receive PHY. The number of send PHYs is equal to the number of receive PHYs.

For multiple bonded Ethernet PHYs, multiple send PHYs are respectively bonded to multiple receive PHYs. The number of multiple send PHYs is equal to the number of multiple receive PHYs.

The send PHY is a PHY used for sending data.

The receive PHY is a PHY used for receiving data.

All PHYs in the embodiments provide are Ethernet PHYs.

For a flexible Ethernet (FlexE), the FlexE client, and the FlexE group, refer to the Flexible Ethernet 1.0 Implementation Agreement published by the Optical Internetworking Forum on March, 2016, which is incorporated by reference herein. The embodiments include the Flexible Ethernet 1.0 Implementation Agreement.

A logical link is a link established on a physical link. One physical link may be divided into multiple logical links. Alternatively, multiple physical links may constitute one logical link.

Solutions provided in the embodiments may be applied to a backbone network, a convergence network, an access network, an enterprise network, a mobile fronthaul network, or a mobile backhaul network, as desired.

FIG. 1 is a schematic diagram of an application scenario according to an embodiment. As shown in FIG. 1, a first device 101, a forwarding device 102, and a second device 103 are included. The second device 103 may be a sending device, for example, may be a router or a switch. The first device 101 may be a receiving device, for example, may be a router or a switch. The forwarding device 102 may be a router or a switch. The second device 103 is a device that has a function of forwarding a FlexE client.

In the prior art, when the second device 103 forwards a FlexE client to the first device 101 via the forwarding device 102, the forwarding device 102 needs to perform forwarding in a conventional layer 2 (link layer) or layer 3 (network layer) forwarding mode by searching a layer 2 or layer 3 forwarding table. This is a relatively complex operation, and a transmission delay is relatively large. Therefore, the embodiments provide a forwarding table generation method, so as to reduce a transmission delay and improve transmission efficiency.

The following describes the forwarding table generation method according to the embodiments in detail with reference to FIG. 2 to FIG. 7.

FIG. 2 is a schematic flowchart of a forwarding table generation method 200 according to an embodiment. It should be understood that FIG. 2 shows detailed communication steps or operations of the forwarding table generation method. These steps or operations are merely examples. Other operations or transformations of FIG. 2 may also be performed in this embodiment. In addition, the steps in FIG. 2 may be performed according to a sequence different from that presented in FIG. 2, and it is likely that not all the operations in FIG. 2 need to be performed. It should be further understood that a timeslot used in this embodiment may be a calendar slot. For details of the calendar slot, refer to the Flexible Ethernet 1.0 Implementation Agreement.

210. A forwarding device determines a first timeslot set.

Here, the first timeslot set may include multiple timeslots. The multiple timeslots may be multiple timeslots during which the forwarding device sends, to a first device by using a first FlexE group, multiple encoded data blocks generated by a PCS. The multiple timeslots included in the first timeslot set are in a one-to-one correspondence to the multiple encoded data blocks, that is, one timeslot is used to transmit one encoded data block.

The first FlexE group includes one or more send PHYs. The first FlexE group includes one or more receive PHYs. The send PHY in the first FlexE group is bonded to the receive PHY in the first FlexE group.

Herein, the multiple encoded data blocks may be data blocks generated after a second device (or may be referred to as a sending device) encodes an Ethernet frame corresponding to a FlexE client. For example, the multiple encoded data blocks may be multiple 64B/66B data blocks or multiple 8B/10B data blocks.

In this embodiment, the forwarding device and the first device may establish a logical link by using the first FlexE group. The forwarding device may send the multiple encoded data blocks by using the first FlexE group and in the multiple timeslots included in the first timeslot set. The first device (or may be referred to as a receiving device) may receive, by using the first FlexE group and in the multiple timeslots included in the first timeslot set, the multiple encoded data blocks sent by the forwarding device. In addition, the first device may generate, according to the multiple received encoded data blocks, an Ethernet frame corresponding to a FlexE client.

For example, during allocation of time domain resources, the time domain resources may be divided into multiple periods. Each period in the multiple periods includes 20 timeslots, which are a timeslot 0 to a timeslot 19 respectively. Duration of each timeslot may be 1 millisecond (ms). Duration of a period may be 20 ms. The forwarding device may allocate timeslots 7, 8, 9, and 10 in each period to the first FlexE group. The first FlexE group may be a FlexE group 1, and the first timeslot set may include the timeslots 7, 8, 9, and 10. The forwarding device may respectively send, by using the FlexE group 1 and in the timeslots 7, 8, 9, and 10 in each period, the multiple encoded data blocks generated by a physical coding sublayer of the second device. The first device respectively receives the multiple encoded data blocks by using the FlexE group 1 and in the timeslots 7, 8, 9, and 10 in each period, and generates the Ethernet frame according to the multiple received encoded data blocks. That is, the first device may restore, according to the multiple encoded data blocks, the Ethernet frame obtained by the second device. For example, the first device may reorder and reassemble the multiple encoded data blocks to generate the Ethernet frame. Alternatively, the forwarding device may allocate timeslots 7, 8, 9, and 10 in a first period to the first FlexE group, but the forwarding device does not allocate timeslots 7, 8, 9, and 10 in another period to the first FlexE group. In this case, the forwarding device may send the multiple encoded data blocks by using the FlexE group 1 and in the timeslots 7, 8, 9, and 10 in the first period. The first device receives the multiple encoded data blocks by using the FlexE group 1 and in the timeslots 7, 8, 9, and 10 in the first period, and generates the Ethernet frame according to the multiple received encoded data blocks.

220. The forwarding device determines a second timeslot set.

Here, the second timeslot set may include multiple timeslots. The multiple timeslots may be multiple timeslots during which the forwarding device receives, by using a second FlexE group, the multiple encoded data blocks sent by the second device. Herein, the multiple timeslots included in the second timeslot set are in a one-to-one correspondence to the multiple encoded data blocks, that is, one timeslot is used to transmit one encoded data block.

The forwarding device includes a receive PHY in the second FlexE group. The second device includes a send PHY in the second FlexE group.

In this embodiment, the forwarding device and the second device may establish a logical link by using the second FlexE group. The second device may send the multiple encoded data blocks by using the second FlexE group and in the multiple timeslots included in the second timeslot set. The forwarding device may receive, by using the second FlexE group and in the multiple timeslots included in the second timeslot set, the multiple encoded data blocks sent by the second device.

For example, the second FlexE group may be a FlexE group 2, and the second timeslot set may include timeslots 0, 6, 7, and 10. The second device may respectively transmit, by using the FlexE group 2 and in timeslots 0, 6, 7, and 10 in each timeslot period, the encoded data blocks generated by the physical coding sublayer of the second device. The forwarding device may respectively receive the encoded data blocks by using the FlexE group 2 and in the timeslots in each timeslot period, and then respectively send, to the first device, the encoded data blocks by using the FlexE group 1 and in the timeslots 7, 8, 9, and 10 in each timeslot period.

230. The forwarding device generates a forwarding table, where the forwarding table includes a mapping relationship between a second FlexE group and multiple timeslots included in the second timeslot set, and a mapping relationship between a first FlexE group and multiple timeslots included in the first timeslot set.

For example, the forwarding device may establish, according to the determined second FlexE group, the multiple timeslots included in the second timeslot set, the first FlexE group, and the multiple timeslots included in the first timeslot set, the mapping relationship between the second FlexE group and the multiple timeslots included in the second timeslot set, and between the first FlexE group and the multiple timeslots included in the first timeslot set. It should be understood that the multiple timeslots included in the first timeslot set are in a one-to-one correspondence to the multiple timeslots included in the second timeslot set.

For example, the mapping relationship included in the forwarding table includes a mapping relationship between first information and second information. The first information includes the second FlexE group and the multiple timeslots included in the second timeslot set. The second information includes the first FlexE group and the multiple timeslots included in the first timeslot set.

Optionally, the method may further include: sending, by the forwarding device, the multiple encoded data blocks according to the forwarding table.

Optionally, the method may further include: skipping performing, by the forwarding device, layer 2 (link layer) or layer 3 (network layer) processing on the multiple encoded data blocks after the forwarding device receives the multiple encoded data blocks by using the second FlexE group and in the multiple timeslots included in the second timeslot set, and before the forwarding device sends the multiple encoded data blocks by using the first FlexE group and in the multiple timeslots included in the first timeslot set.

For ease of understanding and description, a specific process of forwarding encoded data blocks corresponding to a FlexE client is used as an example in the following, and a mapping table established by the forwarding device is described in detail with reference to FIG. 1 and Table 1.

It is assumed that a forwarding path of the FlexE client is the second device 103→the forwarding device 102→the first device 101 shown in FIG. 1.

For example, the second FlexE group is the FlexE group 2, the second timeslot set includes the timeslots 0, 6, 7, and 10, the first FlexE group is the FlexE group 1, and the first timeslot set includes the timeslots 7, 8, 9, and 10. The mapping table established by the forwarding device may be shown in Table 1. It should be understood that an inbound FlexE group in Table 1 represents a FlexE group used by the forwarding device to receive encoded data blocks, and is represented by using a FlexE group number. An inbound timeslot set includes timeslots used by the forwarding device to receive the encoded data blocks, and is represented by using a timeslot number. An outbound FlexE group represents a FlexE group used by the forwarding device to send the encoded data blocks, and is represented by using a FlexE group number. An outbound timeslot set includes timeslots used by the forwarding device to send the encoded data blocks, and is represented by using a timeslot number.

TABLE 1

| Inbound FlexE group | Inbound timeslot set | Outbound FlexE group | Outbound timeslot set |
| --- | --- | --- | --- |
| 2 | 0, 6, 7, 10 | 1 | 7, 8, 9, 10 |
| 3 | 1, 2, 5 | 4 | 3, 5, 8 |
| ... | ... | ... | ... |

TABLE 1-continued

| Inbound FlexE group | Inbound timeslot set | Outbound FlexE group | Outbound timeslot set |
| --- | --- | --- | --- |

It may be learned, with reference to Table 1 and FIG. 1, that the encoded data blocks generated from the FlexE client by the physical coding sublayer of the second device 103 are sent by using the FlexE group 2 and in the timeslots 0, 6, 7, and 10. The forwarding device 102 receives, by using the FlexE group 2 between the forwarding device 102 and the second device 103 and in the timeslots 0, 6, 7, and 10, the encoded data blocks sent by the second device 103, and sends the encoded data blocks by using the FlexE group 1 and in the timeslots 7, 8, 9, and 10. The first device 101 receives, by using the FlexE group 1 and in the timeslots 7, 8, 9, and 10, the encoded data blocks sent by the forwarding device 102, and may restore the FlexE client according to the encoded data blocks. In this way, the FlexE client is transmitted by using an end-to-end channel established by using the FlexE group 1, the FlexE group 2, and Table 1, thereby improving transmission efficiency.

It should be understood that the forwarding table shown in Table 1 is merely an example for description, and thus is not be limiting. The forwarding table established by the forwarding device includes the inbound FlexE group, the inbound timeslot set, the outbound FlexE group, and the outbound timeslot set. However, Table 1 is not necessarily an expression form of the forwarding table, that is, the forwarding device may represent the forwarding table by using Table 1 or by using another form different from Table 1.

It should be further understood that only one forwarding device 102 is used as an example in FIG. 1. There may be multiple forwarding devices on a forwarding path from the second device 103 to the first device 101. Each forwarding device may establish a forwarding table as that shown in Table 1, and each forwarding device performs forwarding according to the forwarding table.

According to the forwarding table generation method in this embodiment, a forwarding device can establish a transmission path between two nodes by generating a forwarding table, so that a FlexE client can be transmitted by using a mapping relationship, in the forwarding table, between a second FlexE group and multiple timeslots in a second timeslot set, and a first FlexE group and multiple timeslots in a first timeslot set. Compared with the prior art in which the forwarding device needs to perform forwarding in a conventional layer 2 (link layer) or layer 3 (network layer) forwarding mode by searching a layer 2 or layer 3 forwarding table, the embodiments can reduce a transmission delay, and improve transmission efficiency.

Optionally, when determining the first timeslot set, the forwarding device may determine the first timeslot set according to a first message sent by the first device.

For example, the forwarding device may receive the first message sent by the first device. The first message is used to instruct the forwarding device to determine the first timeslot set. The forwarding device determines first available timeslots of the forwarding device as the first timeslot set according to the first message. Herein, the first timeslot set is determined by the forwarding device. The forwarding device may detect available timeslots by using a slot configuration module in the device, select the first available timeslots (for example, the timeslots 7, 8, 9, and 10) from the available timeslots, and use the first available timeslots as the first timeslot set.

In this embodiment, the first message may be a reservation (Resv) message in the Resource Reservation Protocol (RSVP). For ease of description, the reservation message herein may be referred to as a first reservation message. The first reservation message may be used to instruct the forwarding device to determine the first timeslot set.

The first reservation message may further include path type instruction information, which is used to instruct to establish a FlexE-based path.

The foregoing solution may be implemented by extending RFC3473 published by the Internet Engineering Task Force (IETF). For example, the path type instruction information may be a new class-type value added to a flow specification FLOWSPEC object carried in the first reservation message. The new class-type value may be implemented by extending a field defined in RFC3473. For example, when the class-type value is 9, it may indicate establishment of a FlexE-based path. It should be understood that, that the class-type value being 9 indicates establishment of a FlexE-based path is merely an example, and shall not constitute a limitation on this embodiment.

The path type instruction information may further be a new extended session type in the RSVP, for example, may be a new class-type value in a session object of the RSVP. For example, when the class-type value is 25, it indicates establishment of a FlexE-based path. It should be understood that, that the class-type value being 25 indicates establishment of a FlexE-based path is merely an example, and shall not constitute a limitation on this embodiment.

In addition, the first reservation message may further include traffic parameter attribute information.

As an example, a format of the traffic parameter attribute information may be shown in FIG. 3. As shown in FIG. 3, the traffic parameter attribute information may include a signal type field, a reserved field, and a bit_rate field. The signal type field is used to represent a type of a carried signal. For example, when the signal type=1, it indicates that a signal type is an encoded data block whose rate is 5 Gbps. The bit_rate field represents a rate of a FlexE client corresponding to the multiple encoded data blocks. For example, when the Bit_rate=10, it indicates that a rate of the FlexE client corresponding to the multiple encoded data blocks is 10 Gbps.

It should be understood that the format of the traffic parameter attribute information shown in FIG. 3 is merely an example of the traffic parameter attribute information in this embodiment, and thus is not limiting. The format of the traffic parameter attribute information is not limited in this embodiment.

Further, after the forwarding device determines the first timeslot set, optionally, the method may further include: sending, by the forwarding device, a second message to the first device, where the second message may carry identifiers of the multiple timeslots included in the first timeslot set.

For example, the forwarding device may notify, by sending the second message to the first device, the first device of the first timeslot set determined by the forwarding device, and instruct, by using the second message, the first device to determine the multiple timeslots included in the first timeslot set as timeslots during which the first device receives the multiple encoded data blocks by using the first FlexE group.

Herein, the forwarding device may send the second message to the first device by using an in-band control channel in a FlexE.

Optionally, that the forwarding device determines a second timeslot set may include: the forwarding device sends a third message to the second device, where the third message is used to instruct the second device to determine available timeslots of the second device as the second timeslot set; the forwarding device receives a fourth message sent by the second device, where the fourth message carries identifiers of the multiple timeslots included in the second timeslot set; and the forwarding device determines the second timeslot set according to the identifiers that are of the multiple timeslots included in the second timeslot set and that are carried in the fourth message.

For example, the forwarding device may instruct, by sending the third message to the second device, the second device to determine the second timeslot set. After receiving the third message, the second device may determine the second timeslot set. Herein, the second device may detect available timeslots by using a timeslot configuration module in the device, select the second available timeslots (for example, the timeslots 0, 6, 7, and 10) from the available timeslots, and use the second available timeslots as the second timeslot set. After determining the second timeslot set, the second device sends the fourth message to the forwarding device to notify the forwarding device of the second timeslot set determined by the second device. The forwarding device determines the second timeslot set according to the identifiers that are of the multiple timeslots included in the second timeslot set and that are carried in the received fourth message.

In this embodiment, the third message may be a reservation message in the RSVP. For ease of description, the reservation message in the RSVP herein may be referred to as a second reservation message. The second reservation message may be used to instruct the second device to determine the second timeslot set.

For the second reservation message, refer to description of the first reservation message. For brevity, details are not described herein again.

Herein, the second device may send the fourth message to the forwarding device by using an in-band control channel in the FlexE.

Optionally, when determining the first timeslot set, the forwarding device may determine the first timeslot set according to identifiers that are of the multiple timeslots included in the first timeslot set and that are sent by the first device.

For example, the first device may first determine the first timeslot set (for example, the timeslots 7, 8, 9, and 10), and then send the identifiers of the multiple timeslots included in the first timeslot set to the forwarding device. Herein, the multiple timeslots included in the first timeslot set are timeslots that are determined by the first device and that are used to receive the multiple encoded data blocks by using the first FlexE group. The forwarding device may determine the first timeslot set after receiving the identifiers that are of the multiple timeslots included in the first timeslot set and that are sent by the first device.

In this embodiment, when sending the identifiers of the multiple timeslots included in the first timeslot set to the forwarding device, the first device may send, by sending a Resv message in the RSVP to the forwarding device, the identifiers of the multiple timeslots included in the first timeslot set. For ease of description, the reservation message herein may be referred to as a third reservation message. For example, the third reservation message may carry the identifiers of the multiple timeslots included in the first timeslot set.

For the third reservation message, refer to description of the first reservation message and the second reservation message. For brevity, details are not described herein again.

Further, the first device may use a generalized multiprotocol label switching GMPLS label included in the third reservation message to carry the identifiers of the multiple timeslots included in the first timeslot set. For ease of description, the GMPLS label herein may be referred to as a first GMPLS label.

Figure 4:
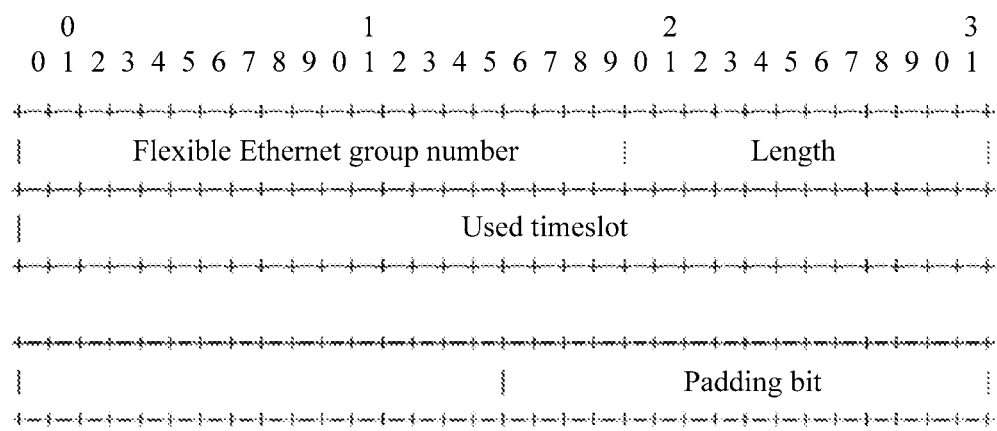
FIG. 4 is a schematic diagram of a format of a GMPLS label according to an embodiment.

As an example, a format of the GMPLS label is shown in FIG. 4. As shown in FIG. 4, the first GMPLS label may include a first field and a second field. The first field may be referred to as a used slot field. The used slot field may represent the identifiers of the multiple timeslots in the first timeslot set. The second field may be referred to as a flexible Ethernet group number (FlexE Group number) field and represents that a used FlexE group is the first FlexE group herein. The first GMPLS label may further include a third field and a fourth field. The third field may represent a length of the used slot field. The fourth field may be referred to as padding bits. If a sum of lengths of the first field, the second field, and the third field is not a multiple of four bytes, padding bits are used to enable the sum of the lengths of the first field, the second field, and the third field to be a multiple of four bytes. For example, the first field may occupy 80 bits to represent used timeslots. For example, the multiple timeslots included in the first timeslot set may be represented by setting bits in the used slot field that are corresponding to the timeslots 7, 8, 9, and 10 to 1 and setting other bits to 0. The first field may also have 20 bits, and this is not limited in this embodiment. The second field may occupy 20 bits. When a FlexE group number=1, it indicates that the FlexE group 1 (an example of the first FlexE group) is used. The third field may have 12 bits. For example, when a Length=80, it indicates that a length of the used slot field is 80 bits. A length of the fourth field may be 16. In this way, a sum of lengths of the first field, the second field, the third field, and the fourth field is a multiple of four bytes.

It should be understood that the first GMPLS label shown in FIG. 4 is merely a specific format of a GMPLS label in this embodiment, and a format of the GMPLS label is not limited in this embodiment.

Optionally, the method may further include: sending, by the forwarding device, an instruction message to the second device. The instruction message carries identifiers of the multiple timeslots included in the second timeslot set. The instruction message is used to instruct the second device to configure the multiple timeslots included in the second timeslot set as timeslots during which the second device sends the multiple encoded data blocks to the forwarding device by using the second FlexE group.

After determining the second timeslot set (for example, the timeslots 0, 6, 7, and 10), the forwarding device may notify, by sending the instruction message to the second device, the second device of the second timeslot set that is determined by the forwarding device. For example, the forwarding device may add the identifiers of the multiple timeslots included in the second timeslot set to the instruction message. After receiving the instruction message sent by the forwarding device, the second device may learn of the second timeslot set and may configure the multiple timeslots included in the second timeslot set as the timeslots during which the second device sends the multiple encoded data blocks to the forwarding device by using the second FlexE group. That is, when forwarding the FlexE client, the second device may send the multiple encoded data blocks to the forwarding device by using the second FlexE group and in the multiple timeslots included in the second timeslot set.

In this embodiment, when sending the instruction message to the second device, the forwarding device may send, by sending a reservation message in the RSVP to the forwarding device, the identifiers of the multiple timeslots included in the second timeslot set. For ease of description, the reservation message herein may be referred to as a fourth reservation message. For example, the fourth reservation message may carry the identifiers of the multiple timeslots included in the second timeslot set.

For the fourth reservation message, refer to description of the first reservation message, the second reservation message, and the third reservation message. For brevity, details are not described herein again.

Further, the forwarding device may use a GMPLS label included in the fourth reservation message to carry the identifiers of the multiple timeslots included in the second timeslot set. For ease of description, the GMPLS label herein may be referred to as a second GMPLS label. For the second GMPLS label, refer to description of the first GMPLS label. For brevity, details are not described herein again. It should be noted that when the first timeslot set is different from the second timeslot set, a value of a used slot in the second GMPLS label is different from a value of the used slot in the first GMPLS label.

This embodiment may be based on the RSVP. Based on extension of the RSVP, a FlexE-based path from the second device to the first device via the forwarding device is established by establishing a forwarding table.

Figure 5:
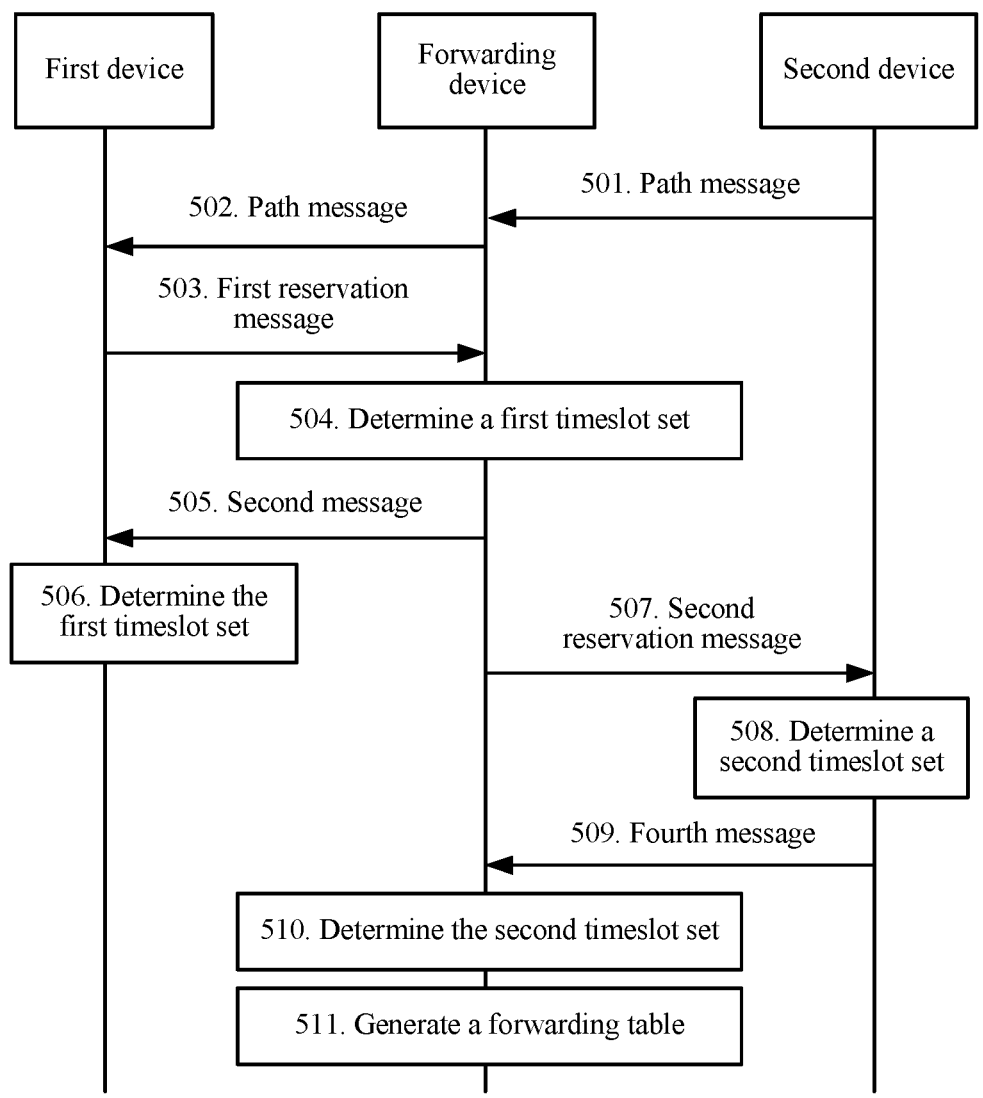
FIG. 5 is a schematic flowchart of a forwarding table generation method according to an embodiment.
Figure 6:
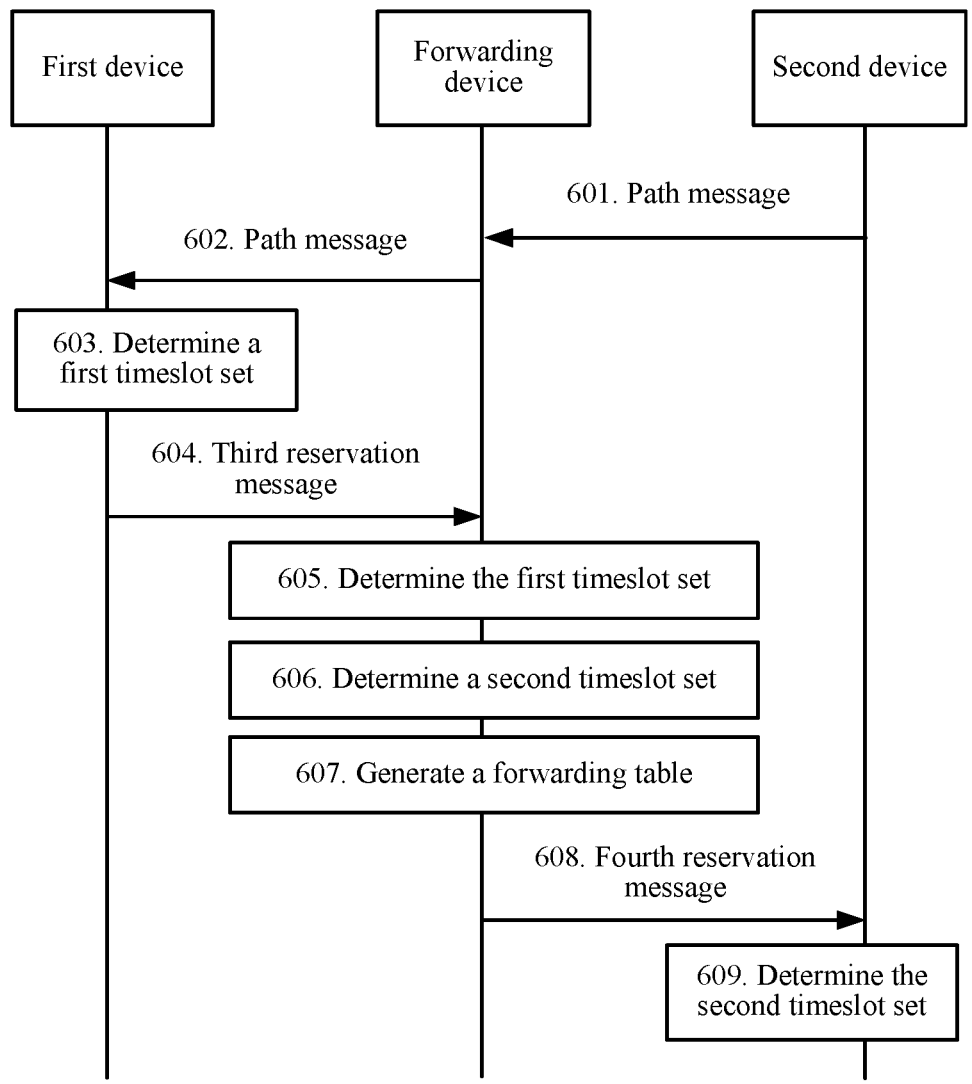
FIG. 6 is a schematic flowchart of a forwarding table generation method according to another embodiment.

The following describes the forwarding table generation method according to the embodiments in detail with reference to FIG. 5 and FIG. 6. Methods shown in FIG. 5 and FIG. 6 may be obtained by extending the method shown in FIG. 2. During specific implementation of the methods shown in FIG. 5 and FIG. 6, refer to the foregoing description for the method shown in FIG. 2, and details are not described herein again.

It should be noted that for the following terms, words, or the like same as those in the foregoing, refer to the foregoing description. For brevity, details are not described again in the following.

FIG. 5 is a schematic flowchart of a forwarding table generation method according to an embodiment. It should be understood that FIG. 5 shows detailed communication steps or operations of the forwarding table generation method. However, these steps or operations are merely examples. Other operations or transformations of the operations in FIG. 5 may also be performed in this embodiment. In addition, the steps in FIG. 5 may be performed according to a sequence different from that presented in FIG. 5, and it is likely that not all the operations in FIG. 5 need to be performed.

501. A second device sends a path message to a forwarding device.

The path message may carry path type instruction information.

The path type instruction information may be a new class-type value added (or extended) to a sender traffic specification SENDER_TSPEC object carried in the path message. The new class-type value may be implemented by extending a field defined in RFC3473. For example, when the class-type value=9, it may indicate establishment of a FlexE-based path. It should be understood that, that the class-type value being 9 indicates establishment of a FlexE-based path is merely an example, and shall not constitute a limitation on this embodiment.

The path type instruction information may further be a new extended session type in the RSVP, for example, may be a new class-type value in a session object of the RSVP. For example, when the class-type value is 25, it may indicate establishment of a FlexE-based path. It should be understood that, that the class-type value being 25 indicates establishment of a FlexE-based path is merely an example, and shall not constitute any limitation on this embodiment.

Further, the path message may further carry traffic parameter attribute information. For the traffic parameter attribute information, refer to the foregoing description for the traffic parameter attribute information in the first reservation message. For brevity, details are not described herein again.

502. The forwarding device forwards the path message to a first device.

503. The first device sends a first reservation message to the forwarding device.

Here, after receiving the path message, the first device sends, to the forwarding device, the first reservation message in response to the path message. The first reservation message may be used to instruct the forwarding device to determine a first timeslot set.

504. The forwarding device determines a first timeslot set.

Here, after receiving the first reservation message, the forwarding device may detect available timeslots by using a timeslot configuration module in the device and select the first timeslot set from the available timeslots.

505. The forwarding device sends a second message to the first device, where the second message may carry identifiers of multiple timeslots in the first timeslot set.

506. The first device determines the first timeslot set.

After receiving the second message sent by the forwarding device, the first device determines the first timeslot set according to the identifiers that are of the multiple timeslots included in the first timeslot set and that are carried in the second message and configures the first timeslot set as timeslots used to receive, by using a first FlexE group, a FlexE client sent by the forwarding device.

507. The forwarding device sends a second reservation message to the second device.

The second reservation message may be used to instruct the second device to determine a second timeslot set.

508. The second device determines a second timeslot set.

Here, after receiving the second reservation message, the second device may detect available timeslots by using a slot configuration module in the device, and select the second timeslot set (for example, timeslots 0, 6, 7, and 10) from the available timeslots.

509. The second device sends a fourth message to the forwarding device.

510. The forwarding device determines the second timeslot set.

Here, after receiving the fourth message sent by the second device, the forwarding device determines the second timeslot set according to identifiers that are of multiple timeslots included in the second timeslot set and that are carried in the fourth message.

511. The forwarding device generates a mapping table.

The mapping table shown in Table 1 is generated, and when the FlexE client is being forwarded, encoded data blocks generated from the FlexE client by a physical coding sublayer of the second device are sent by using the FlexE group 2 and in the timeslots 0, 6, 7, and 10. The forwarding device receives, by using the FlexE group 2 between the forwarding device and the second device and in the timeslots 0, 6, 7, and 10, the encoded data blocks sent by the second device, and sends the encoded data blocks by using the FlexE group 1 and in timeslots 7, 8, 9, and 10. The first device receives, by using the FlexE group 1 and in the timeslots 7, 8, 9, and 10, the encoded data blocks sent by the forwarding device, and may restore the FlexE client according to the encoded data blocks. In this way, the FlexE client is transmitted by using an end-to-end channel established by using the FlexE group 1, the FlexE group 2, and Table 1, thereby improving transmission efficiency.

FIG. 6 is a schematic flowchart of a forwarding table generation method according to another embodiment. It should be understood that FIG. 6 shows detailed communication steps or operations of the forwarding table generation method. However, these steps or operations are merely examples. Other operations or transformations of the operations in FIG. 6 may also be performed in this embodiment. In addition, the steps in FIG. 6 may be performed according to a sequence different from that presented in FIG. 6, and it is likely that not all the operations in FIG. 6 need to be performed.

601. A second device sends a path message to a forwarding device.

Here, for the path message, refer to description of step 501 in the method shown in FIG. 5.

Figures 7, 8:
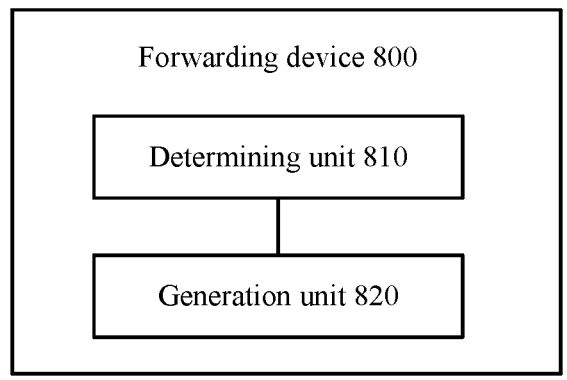
FIG. 7 is a schematic diagram of a format of a label request object according to an embodiment.
FIG. 8 is a schematic block diagram of a forwarding device according to an embodiment.

In addition, in this embodiment, the path message may further carry a label request object. A format of the label request object is shown in FIG. 7. The format of the label request object includes a length field, a class-number (class-num) field, a class-type field, an LSP encoding type field, a switch type field, and a G-PID field. The length field represents a length of the label request object. The class-number field represents that the object is a label request object, and a value of the class-num field is 19. The class-type field represents that a label request is a generalized label request, and a value of the class-type field may be 4. The LSP encoding type field represents a FlexE-based path, and a value of the LSP encoding type field may be 15. The switch type field represents that an applied switching technology is a FlexE, and a value of the switch type field may be 111. The generalized protocol identifier field represents that a 64B/66B Ethernet technology is used and is applied to a flexible Ethernet, and a value of the G-PID field may be 71.

It should be understood that the format of the label request object shown in FIG. 7 is merely an example of the label request object in this embodiment, and shall not constitute any limitation on this embodiment. The format of the label request object is not limited in this embodiment.

602. The forwarding device sends the path message to a first device.

603. The first device determines a first timeslot set.

Here, the first device may detect available timeslots by using a slot configuration module in the first device, select the first timeslot set (for example, timeslots 7, 8, 9, and 10) from the available timeslots, and configure the first timeslot set as timeslots used to receive, by using a first FlexE group, a FlexE client sent by the forwarding device.

604. The first device sends a third reservation message to the forwarding device.

Here, the third reservation message may carry identifiers of multiple timeslots included in the first timeslot set.

605. The forwarding device determines the first timeslot set.

After receiving the third reservation message, the forwarding device may determine the first timeslot set according to the identifiers that are of the multiple timeslots included in the first timeslot set and that are carried in the third reservation message.

606. The forwarding device determines a second timeslot set.

Here, the forwarding device may detect available timeslots by using a slot (Slot) configuration module in the device, and select the second timeslot set (for example, timeslots 0, 6, 7, and 10) from the available timeslots.

607. The forwarding device generates a forwarding table.

608. The forwarding device sends a fourth reservation message to the second device.

Here, the fourth reservation message may carry identifiers of multiple timeslots included in the second timeslot set.

609. The second device determines the second timeslot set.

After receiving the fourth reservation message, the second device may determine the second timeslot set according to the identifiers that are of the multiple timeslots included in the second timeslot set and that are carried in the fourth reservation message and set the second timeslot set to timeslots used to send the FlexE client to the forwarding device by using a second FlexE group.

Therefore, according to the forwarding table generation method in this embodiment, a forwarding device can establish a transmission path between two nodes by generating a forwarding table, so that a FlexE client can be transmitted by using a mapping relationship, in the forwarding table, between a second FlexE group and multiple timeslots in a second timeslot set, and a first FlexE group and multiple timeslots in a first timeslot set. Compared with the prior art in which the forwarding device needs to perform forwarding in a conventional layer 2 (link layer) or layer 3 (network layer) forwarding mode by searching a layer 2 or layer 3 forwarding table, the present invention can reduce a transmission delay, and improve transmission efficiency.

The foregoing describes the forwarding table generation method according to the embodiments with reference to FIG. 1 to FIG. 7. The following describes a forwarding device according to the embodiments with reference to FIG. 8 and FIG. 9.

FIG. 8 shows a schematic block diagram of a forwarding device 800 according to an embodiment. As shown in FIG. 8, the forwarding device 800 includes a determining unit 810 and a generation unit 820. The forwarding device 800 may be used to execute the method shown in FIG. 2. For example, the forwarding device 800 may be used to implement the forwarding device in FIG. 2. Alternatively, the forwarding device 800 may be used to perform steps performed by a forwarding device in the method shown in FIG. 5. For example, the forwarding device 800 may be used to implement the forwarding device in FIG. 5. Alternatively, the forwarding device 800 may be used to perform steps performed by a forwarding device in the method shown in FIG. 6. Further, the forwarding device 800 may be used to implement the forwarding device in FIG. 6. For specific implementation of the forwarding device 800, refer to the foregoing description for FIG. 2, FIG. 5, and FIG. 6, and details are not described herein again.

The determining unit 810 is configured to determine a first timeslot set. The first timeslot set includes multiple timeslots during which the forwarding device sends, to a first device by using a first flexible Ethernet group FlexE group, multiple encoded data blocks generated by a physical coding sublayer. The multiple timeslots included in the first timeslot set are in a one-to-one correspondence to the multiple encoded data blocks.

The determining unit 810 is further configured to determine a second timeslot set. The second timeslot set includes multiple timeslots during which the forwarding device receives, by using a second FlexE group, the multiple encoded data blocks sent by a second device. The multiple timeslots included in the second timeslot set are in a one-to-one correspondence to the multiple encoded data blocks.

The generation unit 820 is configured to generate a forwarding table. The forwarding table includes a mapping relationship between the second FlexE group and the multiple timeslots included in the second timeslot set, and between the first FlexE group and the multiple timeslots included in the first timeslot set.

For example, the mapping relationship included in the forwarding table includes a mapping relationship between first information and second information. The first information includes the second FlexE group and the multiple timeslots included in the second timeslot set. The second information includes the first FlexE group and the multiple timeslots included in the first timeslot set.

The units of the forwarding device 800 in this embodiment and the foregoing other operations or functions are separately for implementing corresponding procedures executed by a forwarding device in the foregoing method. For brevity, details are not described herein.

The forwarding device in this embodiment can establish a transmission path between two nodes by generating a forwarding table, so that a FlexE client can be transmitted by using a mapping relationship, in the forwarding table, between a second FlexE group and multiple timeslots in a second timeslot set, and a first FlexE group and multiple timeslots in a first timeslot set. Compared with the prior art in which the forwarding device needs to perform forwarding in a conventional layer 2 (link layer) or layer 3 (network layer) forwarding mode by searching a layer 2 or layer 3 forwarding table, the present invention can reduce a transmission delay, and improve transmission efficiency.

The embodiments further provide a first device, including a sending unit, a receiving unit, and a determining unit. The first device may be used to execute the method shown in FIG. 2. For example, the first device may be used to implement the first device in FIG. 2. Alternatively, the first device may be used to perform steps performed by a first device in the method shown in FIG. 5. Further, the first device may be used to implement the first device in FIG. 5. For specific implementation of the first device, refer to the foregoing description for FIG. 2 and FIG. 5, and details are not described herein again.

The sending unit is configured to send a first message to a forwarding device. The first message is used to instruct the forwarding device to determine a first timeslot set. The first timeslot set includes multiple timeslots during which the forwarding device sends, to the first device by using a first flexible Ethernet group FlexE group, multiple encoded data blocks generated by a physical coding sublayer. The multiple timeslots included in the first timeslot set are in a one-to-one correspondence to the multiple encoded data blocks.

The receiving unit is configured to receive a second message sent by the forwarding device based on the first message. The second message carries identifiers of the multiple timeslots included in the first timeslot set.

The determining unit is configured to determine the first timeslot set according to the second message, and determine the multiple timeslots included in the first timeslot set as timeslots during which the first device receives the multiple encoded data blocks by using the first FlexE group.

The embodiments further provide a first device, including a determining unit and a sending unit. The first device may be used to execute the method shown in FIG. 2. For example, the first device may be used to implement the first device in FIG. 2. Alternatively, the first device may be used to perform steps performed by a first device in the method shown in FIG. 6. Further, the first device may be used to implement the first device in FIG. 6. For specific implementation of the first device, refer to the foregoing description for FIG. 2 and FIG. 6, and details are not described herein again.

The determining unit is configured to determine a first timeslot set. The first timeslot set includes multiple timeslots during which the first device receives, by using a first flexible Ethernet group FlexE group, multiple encoded data blocks generated by a physical coding sublayer that are sent by a forwarding device. The multiple timeslots included in the first timeslot set are in a one-to-one correspondence to the multiple encoded data blocks.

The sending unit is configured to send identifiers of the multiple timeslots included in the first timeslot set to the forwarding device, so that the forwarding device determines the multiple timeslots included in the first timeslot set as timeslots during which the forwarding device sends the multiple encoded data blocks to the first device by using the first FlexE group.

The embodiments further provide a second device, including a receiving unit, a determining unit, and a sending unit. The second device may be used to execute the method shown in FIG. 2. For example, the second device may be used to implement the second device in FIG. 2. Alternatively, the second device may be used to perform steps performed by a second device in the method shown in FIG. 5. Further, the second device may be used to implement the second device in FIG. 5. For specific implementation of the second device, refer to the foregoing description for FIG. 2 and FIG. 5, and details are not described herein again.

The receiving unit is configured to receive a third message sent by a forwarding device. The third message is used to instruct the second device to determine a second timeslot set. The second timeslot set includes multiple timeslots during which the forwarding device receives, by using a second FlexE group, multiple encoded data blocks sent by the second device. The multiple timeslots included in the second timeslot set are in a one-to-one correspondence to the multiple encoded data blocks.

The determining unit is configured to determine the second timeslot set according to the third message.

The sending unit is configured to send a fourth message to the forwarding device. The fourth message carries identifiers of the multiple timeslots included in the second timeslot set. The fourth message is used to instruct the forwarding device to configure the multiple timeslots included in the second timeslot set as timeslots during which the second device sends the multiple encoded data blocks to the forwarding device by using the second FlexE group.

The embodiments further provide a second device, including a receiving unit and a configuration unit. The second device may be used to execute the method shown in FIG. 2. For example, the second device may be used to implement the second device in FIG. 2. Alternatively, the second device may be used to perform steps performed by a second device in the method shown in FIG. 6. Further, the second device may be used to implement the second device in FIG. 6. For specific implementation of the second device, refer to the foregoing description for FIG. 2 and FIG. 6, and details are not described herein again.

The receiving unit is configured to receive an instruction message sent by a forwarding device. The instruction message carries identifiers of multiple timeslots included in a second timeslot set. The second timeslot set includes the multiple timeslots during which the forwarding device receives, by using a second FlexE group, multiple encoded data blocks sent by the second device. The multiple timeslots included in the second timeslot set are in a one-to-one correspondence to the multiple encoded data blocks.

The configuration unit is configured to configure, according to the instruction message, the multiple timeslots included in the second timeslot set as timeslots during which the second device sends the multiple encoded data blocks to the forwarding device by using the second FlexE group.

Figure 9:
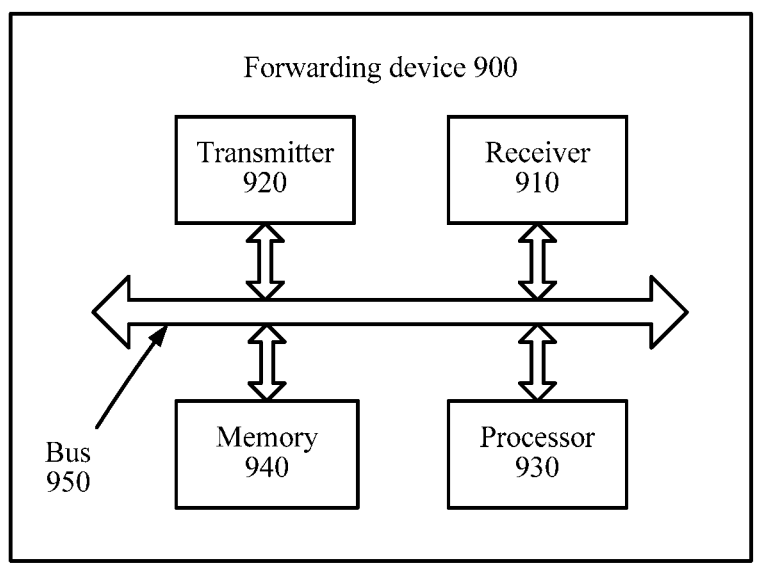
FIG. 9 is a schematic structural diagram of a forwarding device according to an embodiment.

FIG. 9 is a schematic structural diagram of a forwarding device 900 according to an embodiment. The forwarding device 900 may be used to implement the forwarding device 800 shown in FIG. 8. For specific implementation of the forwarding device 900, refer to the foregoing description for the forwarding device 800, and details are not described herein again. As shown in FIG. 9, the forwarding device 900 includes a receiver 910, a transmitter 920, a processor 930, a memory 940, and a bus system 950. The receiver 910, the transmitter 920, the processor 930, and the memory 940 are connected by using the bus system 950. The memory 940 is configured to store an instruction. The processor 930 is configured to execute the instruction stored in the memory 940, so as to control the receiver 910 to receive a signal and control the transmitter 920 to send a signal.

The processor 930 is configured to determine a first timeslot set. The first timeslot set includes multiple timeslots during which the forwarding device sends, to a first device by using a first flexible Ethernet group FlexE group, multiple encoded data blocks generated by a physical coding sublayer. The multiple timeslots included in the first timeslot set are in a one-to-one correspondence to the multiple encoded data blocks.

The processor 930 is further configured to determine a second timeslot set. The second timeslot set includes multiple timeslots during which the forwarding device receives, by using a second FlexE group, the multiple encoded data blocks sent by a second device. The multiple timeslots included in the second timeslot set are in a one-to-one correspondence to the multiple encoded data blocks.

The processor 930 is further configured to generate a forwarding table. The forwarding table includes a mapping relationship between the second FlexE group and the multiple timeslots included in the second timeslot set, and between the first FlexE group and the multiple timeslots included in the first timeslot set.

It should be understood that, in this embodiment, the processor 930 may be a central processing unit (CPU), or the processor 930 may be another general purpose processor, a digital signal processor (DSP), an application-specific integrated circuit (ASIC), a field programmable gate array (FPGA), or another programmable logic device, a discrete gate, or a transistor logic device, a discrete hardware component, or the like. The general purpose processor may be a microprocessor or the processor may be any normal processor, or the like.

The memory 940 may include a read-only memory (ROM) and a random access memory (RAM) and provide an instruction and data to the processor 930. A part of the memory 940 may further include a nonvolatile random access memory. For example, the memory 940 may further store device-type information.

In addition to a data bus, the bus system 950 may further include a power bus, a control bus, a status signal bus, and the like. However, for clarity of description, various buses are marked as the bus system 950 in the figure.

In an implementation process, the steps in the foregoing method may be completed by using an integrated logic circuit of hardware in the processor 930 or using an instruction in a form of software. The steps of the forwarding table generation method disclosed with reference to the embodiments may be directly completed by a hardware processor or may be completed by using a combination of hardware in the processor and a software module. The software module may be located in a mature storage medium in the field, such as a random access memory, a flash memory, a read-only memory, a programmable read-only memory, an electrically-erasable programmable memory, or a register. The storage medium is located in the memory 940. The processor 930 reads information in the memory 940 and completes the steps of the foregoing method in combination with hardware of the processor 930. To avoid repetition, details are not described herein.

The units of the forwarding device 900 in this embodiment and the foregoing other operations or functions are separately for implementing corresponding procedures executed by a forwarding device in the foregoing method. For brevity, details are not described herein.

The forwarding device in this embodiment can establish a transmission path between two nodes by generating a forwarding table, so that a FlexE client can be transmitted by using a mapping relationship, in the forwarding table, between a second FlexE group and multiple timeslots in a second timeslot set, and a first FlexE group and multiple timeslots in a first timeslot set. Compared with the prior art in which the forwarding device needs to perform forwarding in a conventional layer 2 (link layer) or layer 3 (network layer) forwarding mode by searching a layer 2 or layer 3 forwarding table, the embodiments can reduce a transmission delay, and improve transmission efficiency.

The embodiments further provide a first device, including a receiver, a transmitter, a processor, a memory, and a bus system. The receiver, the transmitter, the processor, and the memory are connected by using the bus system. The memory is configured to store an instruction. The processor is configured to execute the instruction stored in the memory, so as to control the receiver to receive a signal and control the transmitter to send a signal.

The transmitter is configured to send a first message to a forwarding device. The first message is used to instruct the forwarding device to determine a first timeslot set. The first timeslot set includes multiple timeslots during which the forwarding device sends, to the first device by using a first flexible Ethernet group FlexE group, multiple encoded data blocks generated by a physical coding sublayer. The multiple timeslots included in the first timeslot set are in a one-to-one correspondence to the multiple encoded data blocks.

The receiver is configured to receive a second message sent by the forwarding device based on the first message. The second message carries identifiers of the multiple timeslots included in the first timeslot set.

The processor is configured to determine the first timeslot set according to the second message, and determine the multiple timeslots included in the first timeslot set as timeslots during which the first device receives the multiple encoded data blocks by using the first FlexE group.

It should be understood that for the memory, the processor, and the bus system, refer to the foregoing description. For brevity, details are not described herein.

The units of the first device in this embodiment and the foregoing other operations or functions are separately for implementing corresponding procedures executed by a first device in the foregoing method. For brevity, details are not described herein.

The embodiments further provide a first device, including a receiver, a transmitter, a processor, a memory, and a bus system. The receiver, the transmitter, the processor, and the memory are connected by using the bus system. The memory is configured to store an instruction. The processor is configured to execute the instruction stored in the memory, so as to control the receiver to receive a signal and control the transmitter to send a signal.

The processor is configured to determine a first timeslot set. The first timeslot set includes multiple timeslots during which the first device receives, by using a first flexible Ethernet group FlexE group, multiple encoded data blocks generated by a physical coding sublayer that are sent by the forwarding device. The multiple timeslots included in the first timeslot set are in a one-to-one correspondence to the multiple encoded data blocks.

The transmitter is configured to send identifiers of the multiple timeslots included in the first timeslot set to the forwarding device, so that the forwarding device determines the multiple timeslots included in the first timeslot set as timeslots during which the forwarding device sends the multiple encoded data blocks to the first device by using the first FlexE group.

It should be understood that for the memory, the processor, and the bus system, refer to the foregoing description. For brevity, details are not described herein.

The units of the first device in this embodiment and the foregoing other operations or functions are separately for implementing corresponding procedures executed by a first device in the foregoing method. For brevity, details are not described herein.

The embodiments further provide a second device, including a receiver, a transmitter, a processor, a memory, and a bus system. The receiver, the transmitter, the processor, and the memory are connected by using the bus system. The memory is configured to store an instruction. The processor is configured to execute the instruction stored in the memory, so as to control the receiver to receive a signal and control the transmitter to send a signal.

The receiver is configured to receive a third message sent by a forwarding device. The third message is used to instruct the second device to determine a second timeslot set. The second timeslot set includes multiple timeslots during which the forwarding device receives, by using a second FlexE group, multiple encoded data blocks sent by the second device. The multiple timeslots included in the second timeslot set are in a one-to-one correspondence to the multiple encoded data blocks.

The processor is configured to determine the second timeslot set according to the third message.

The transmitter is configured to send a fourth message to the forwarding device. The fourth message carries identifiers of the multiple timeslots included in the second timeslot set. The fourth message is used to instruct the forwarding device to configure the multiple timeslots included in the second timeslot set as timeslots during which the second device sends the multiple encoded data blocks to the forwarding device by using the second FlexE group.

It should be understood that for the memory, the processor, and the bus system, refer to the foregoing description. For brevity, details are not described herein.

The units of the second device in this embodiment and the foregoing other operations or functions are separately for implementing corresponding procedures executed by a second device in the foregoing method. For brevity, details are not described herein.

The embodiments further provide a second device, including a receiver, a transmitter, a processor, a memory, and a bus system. The receiver, the transmitter, the processor, and the memory are connected by using the bus system. The memory is configured to store an instruction. The processor is configured to execute the instruction stored in the memory, so as to control the receiver to receive a signal and control the transmitter to send a signal.

The receiver is configured to receive an instruction message sent by a forwarding device. The instruction message carries identifiers of multiple timeslots included in a second timeslot set. The second timeslot set includes multiple timeslots during which the forwarding device receives, by using a second FlexE group, multiple encoded data blocks sent by the second device. The multiple timeslots included in the second timeslot set are in a one-to-one correspondence to the multiple encoded data blocks.

The processor is configured to configure, according to the instruction message, the multiple timeslots included in the second timeslot set as timeslots during which the second device sends the multiple encoded data blocks to the forwarding device by using the second FlexE group.

It should be understood that for the memory, the processor, and the bus system, refer to the foregoing description. For brevity, details are not described herein.

The units of the second device in this embodiment and the foregoing other operations or functions are separately for implementing corresponding procedures executed by a second device in the foregoing method. For brevity, details are not described herein.

It should be understood that the term "and/or" describes only an association relationship for describing associated objects and represents that three relationships may exist. For example, A and/or B may represent the following three cases: Only A exists, both A and B exist, and only B exists. In addition, the character "/" generally indicates an "or" relationship between the associated objects.

It should be understood that sequence numbers of the foregoing processes do not mean execution sequences in various embodiments. The execution sequences of the processes should be determined according to functions and internal logic of the processes and should not be construed as any limitation on the implementation processes of the embodiments.

Persons of ordinary skill in the art may be aware that, in combination with the examples described in the embodiments, units and algorithm steps may be implemented by electronic hardware or a combination of computer software and electronic hardware. Whether the functions are executed by hardware or software depends on particular applications and design constraint conditions of the solutions. Persons of ordinary skill in the art may use different methods to implement the described functions for each particular application.

It may be clearly understood by persons of ordinary skill in the art that, for the purpose of convenient and brief description, for a detailed working process of the foregoing system, apparatus, and unit, refer to a corresponding process in the foregoing method embodiments, and details are not described herein again.

In the several embodiments provided, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit.

When the functions are implemented in the form of a software function unit and configured to be sold or used as an independent product, the functions may be stored in a computer-readable storage medium. Based on such an understanding, the solutions essentially, or the part contributing to the prior art, or some of the solutions may be implemented in a form of a software product. The software product is stored in a storage medium and includes several instructions for instructing a computer device (which may be a personal computer, a server, or a network device) to perform all or some of the steps of the methods described in the embodiments. The foregoing storage medium includes any medium that can store program code, such as a USB flash drive, a removable hard disk, a ROM, a RAM, a magnetic disk, or an optical disc.

What is claimed is:

1. A data forwarding method, comprising:
receiving, via multiple second timeslots of at least one receiving PHY of a forwarding device, multiple encoded data blocks of a flexible Ethernet (FlexE) client sent by an upstream second device;
forwarding, via multiple first timeslots of at least one sending PHY of the forwarding device, the received multiple encoded data blocks to a downstream first device; and
avoiding performing layer 2 and layer 3 processing on the FlexE client in a process from receiving the multiple encoded data blocks to forwarding the multiple encoded data blocks.

2. The method according to claim 1, wherein the at least one sending PHY are multiple sending PHYs which are bonded to form a second FlexE group.

3. The method according to claim 1, wherein the at least one receiving PHY are multiple receiving PHYs which are bonded to form a first FlexE group.

4. The method according to claim 1, further comprising:
sending, by the forwarding device, identifiers of the multiple first timeslots to the first device.

5. The method according to claim 1, further comprising:
receiving, by the forwarding device, identifiers of the multiple second timeslots from the second device.

6. The method according to claim 1, further comprising:
receiving, by the forwarding device, identifiers of the multiple first timeslots from the first device.

7. The method according to claim 1, further comprising:
sending, by the forwarding device, identifiers of the second multiple timeslots to the second device.

8. A data forwarding device, comprising:
a receiver configured to receive, via multiple second timeslots of at least one receiving PHY of a forwarding device, multiple encoded data blocks of a flexible Ethernet (FlexE) client sent by an upstream second device; and
a processor coupled to the receiver, configured to:
forwarding, via multiple first timeslots of at least one sending PHY of the forwarding device, the received multiple encoded data blocks to a downstream first device; and
avoiding performing layer 2 and layer 3 processing on the FlexE client in a process from receiving the multiple encoded data blocks to forwarding the multiple encoded data blocks.

9. The device according to claim 8, wherein the at least one sending PHY are multiple sending PHYs which are bonded to form a second FlexE group.

10. The device according to claim 8, wherein the at least one receiving PHY are multiple receiving PHYs which are bonded to form a first FlexE group.

11. The device according to claim 8, wherein the processor is further configured to send identifiers of the multiple first timeslots to the first device.

12. The device according to claim 8, wherein the processor is further configured to receive identifiers of the multiple second timeslots from the second device.

13. The device according to claim 8, wherein the processor is further configured to receive identifiers of the multiple first timeslots from the first device.

14. The device according to claim 8, wherein the processor is further configured to send identifiers of the multiple second timeslots to the second device.

15. The device according to claim 10, wherein the processor is further configured to:
receive a generalized multiprotocol label switching (GMPLS) label sent by the first device, wherein the GMPLS label comprises a first field and a second field, the first field represents the identifiers of the multiple first timeslots, and the second field represents the first FlexE group.

16. The device according to claim 8, wherein the processor is further configured to:
receive a path message sent by the second device, wherein the path message comprises path type instruction information instructing establishing a FlexE-based path; and
forward the path message to the first device.

17. A data forwarding system, comprising:
an upstream second device, configured to send multiple encoded data blocks of a flexible Ethernet (FlexE) client; and
a forwarding device configured to:
receive, via multiple second timeslots of at least one receiving PHY, the multiple encoded data blocks;
forward, via multiple first timeslots of at least one sending PHY of the forwarding device, the received multiple encoded data blocks to a downstream first device; and
avoid performing layer 2 and layer 3 processing on the FlexE client in a process from receiving the multiple encoded data blocks to forwarding the multiple encoded data blocks;
wherein the downstream first device is configured to receive the forwarded multiple encoded data blocks.

18. The system according to claim 17, wherein the at least one sending PHY are multiple sending PHYs which are bonded to form a second FlexE group.

19. The system according to claim 17, wherein the at least one receiving PHY are multiple receiving PHYs which are bonded to form a first FlexE group.

20. The system according to claim 18, wherein the at least one receiving PHY are multiple receiving PHYs which are bonded to form a first FlexE group.

* * * * *